UNITED STATES PATENT OFFICE.

RENÉ BOHN, OF MANNHEIM, GERMANY, ASSIGNOR TO THE BADISCHE ANILIN AND SODA FABRIK, OF LUDWIGSHAFEN, GERMANY.

GREEN-BLUE DYE AND PROCESS OF MAKING SAME.

SPECIFICATION forming part of Letters Patent No. 633,950, dated September 26, 1899.

Application filed August 10, 1898. Serial No. 688,274. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of new Coloring-Matter, of which the following is a specification.

As is well known, naphthazarin can be prepared by heating 1.5-dinitro-naphthalene with concentrated or fuming sulfuric acid, with or without the addition of reducing agents. In this manufacture a body is formed which is known as the "naphthazarin intermediate product." The chemical constitution of this body has never been definitely ascertained and described, and the substance is known under this name only, both in patents and in general scientific literature. It is more particularly described in the specification of the German Patent, No. 76,922, published on the 21st of August, 1894, in the following terms: Its solution in concentrated sulfuric acid (containing about ninety-five per cent. $H_2SO_4$) is brown. In dilute sulfuric acid it dissolves with a pure blue color. This color is not appreciably changed on adding caustic soda lye; but if an excess of hydrochloric acid be added to the dilute sulfuric-acid solution the color turns to a greenish brown. When isolated, this naphthazarin intermediate product is a violet powder possessing a metallic luster, slightly soluble in water and giving a blue solution, which is not changed in color by the addition of sodium carbonate or of a caustic soda lye. In the presence of a little hydrochloric acid it dissolves readily with a pure blue color. If the solution in dilute sulfuric acid be boiled, the blue color changes to red, and on cooling naphthazarin separates out. It is this naphthazarin intermediate product which can be obtained, as described, from 1.5-dinitro-naphthalene, which constitutes the initial material for my invention.

My present invention relates to the discovery that on suitable oxidation of this intermediate product a new coloring-matter can be obtained which dyes on chrome-mordants, giving fast shades of a greener cast than those obtained with naphthazarin.

The following example will serve to further illustrate the nature of the invention. The parts are by weight:

Prepare a naphthazarin melt in the usual way by heating 1.5-dinitro-naphthalene with concentrated or fuming sulfuric acid, with the addition of a suitable reducing agent. Pour five hundred (500) parts thereof, corresponding to about fifteen (15) parts of naphthazarin, into about two thousand five hundred (2,500) parts of water. A blue solution is obtained. Add to this two hundred (200) parts of a solution of sodium hypochlorite of 6° Baumé. A green body separates out. Filter and wash free from acid.

The invention is not restricted to the use of the materials or proportions given in the above example. For instance, instead of taking the naphthazarin melt the isolated intermediate compound may be taken, say, in the form of its sodium salt, and instead of the hypochlorite as oxidizing agent other oxidizing agents may be used, such as potassium bichromate.

The new product can be used in dyeing either as such or in the form of its bisulfite compound.

The new coloring-matter, in paste form, has a greenish-blue appearance. It gives a blue-violet solution in sodium-carbonate solution and a blue solution in caustic soda lye. It is but very little soluble in water, but on boiling gives a somewhat blue solution. Its solution in concentrated sulfuric acid is brown.

Now what I claim is—

1. The new coloring-matter which can be obtained by the oxidation of the naphthazarin intermediate product, as hereinbefore defined, and which yields a blue solution in caustic soda lye and a brown solution in concentrated sulfuric acid and a blue-violet solution with a solution of sodium carbonate; in the moist state it is a paste having a green to green-blue appearance.

2. The process for the manufacture of a new coloring-matter, consisting in subjecting the naphthazarin intermediate product, as hereinbefore defined, to the action of an oxidizing agent, substantially as described.

In testimony whereof I have hereunto set my hand in the presence of two subscribing witnesses.

RENÉ BOHN.

Witnesses:
GUSTAV L. LIETTENBERGER,
ADOLPH REUTLINGER.